(12) United States Patent
Nakata et al.

(10) Patent No.: US 7,095,918 B2
(45) Date of Patent: Aug. 22, 2006

(54) OPTICAL WAVELENGTH SWITCH HAVING PLANAR LIGHTWAVE CIRCUIT STRUCTURE

(75) Inventors: Hidehiko Nakata, Isehara (JP); Satoshi Ide, Kawasaki (JP); Koji Terada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/799,579

(22) Filed: Mar. 11, 2004

(65) Prior Publication Data

US 2004/0264846 A1 Dec. 30, 2004

(30) Foreign Application Priority Data

Jun. 27, 2003 (JP) .............................. 2003-185190

(51) Int. Cl.
G02B 6/26 (2006.01)
G02B 6/42 (2006.01)
G02B 7/182 (2006.01)
H04J 14/00 (2006.01)

(52) U.S. Cl. .......................... 385/18; 385/16; 385/17; 359/872; 398/45; 398/57

(58) Field of Classification Search ............ 385/16–18; 359/872–874; 398/45–57
See application file for complete search history.

(56) References Cited

U.S. PATENT DOCUMENTS 5,960,133 A 9/1999 Tomlinson 6,456,760 B1 * 9/2002 Kurokawa et al. ............ 385/31
6,810,177 B1 * 10/2004 Kaneko ........................ 385/37
6,892,003 B1 * 5/2005 Katayama et al. ............ 385/39

FOREIGN PATENT DOCUMENTS

JP 2002031768 * 1/2002

* cited by examiner

*Primary Examiner*—Brian Healy
*Assistant Examiner*—Charlie Peng
(74) *Attorney, Agent, or Firm*—Katten Muchin Rosenman LLP (57) ABSTRACT

An optical wavelength switch having a planar wave guide formed on a substrate is disclosed that comprises a wave-guide-type diffraction grating which includes an input/output wave guide having an under-clad layer on a sacrificial layer formed on the substrate, a core layer formed on the under-clad layer and an over-clad layer formed on the core layer, a first slab wave guide connected with the input/output wave guide, an array wave guide whose one side is connected with the first slab wave guide, and a second slab wave guide with which the other side of the array wave guide is connected; and a movable girder whose one end is firmly secured to the substrate, the movable girder having the same under-clad layer, core layer and over-clad layer as those of the wave-guide-type diffraction grating, wherein the optical wavelength switch has a reflecting mirror at the tip of the movable girder, the reflecting mirror facing an end face of the second slab waveguide, with the position of the reflecting mirror being set displaceable along a direction perpendicular to the optical axis.

8 Claims, 7 Drawing Sheets

FIG. 1

PRIOR ART

FIG. 2

PRIOR ART

OPTICAL WAVELENGTH SWITCH HAVING PLANAR LIGHTWAVE CIRCUIT STRUCTURE

BACKGROUND OF THE INVENTION

1. Field of the Invention

The present invention relates to an optical wavelength switch having a planar lightwave circuit structure for use in optical communication, etc.

2. Description of the Related Arts

In recent years, communication capacity has explosively increased and construction of a photonic network having a large capacity using Wavelength Division Multiplexing (WDM) for coping with the increase has made progress. For an efficient composition of the WDM photonic network, wavelength switches are indispensable which realize Optic Add-Drop Modules (OAD) or optical cross-connect modules disposed in optical transmission paths.

Figure 1:
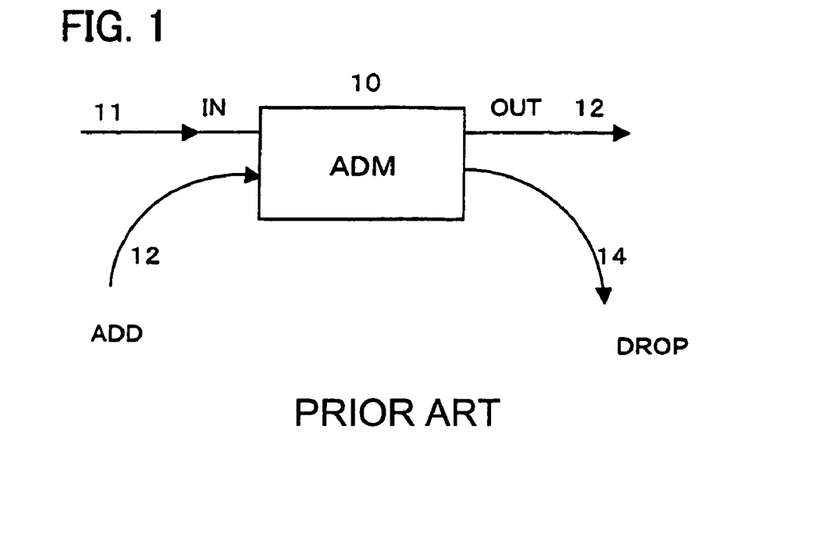
FIG. 1 is a diagram illustrating an ordinary optic add-drop module.

FIG. 1 is a diagram illustrating an optical add-drop module 10 and this module 10 inputs an input optical beam having been wavelength-multiplexed from a previous-stage node into an input port 11 and inputs an insert (Add) optical beam having a specific wavelength at the node into an insert port 12. Furthermore, a part of the input optical beam 11 and the insertion optical beam 12 are outputted unprocessed passing through (Through) to an output-side port 13 and a part of the input optical beam 11 having a specific wavelength is branched (Drop) to a branch port 14.

Figure 2:
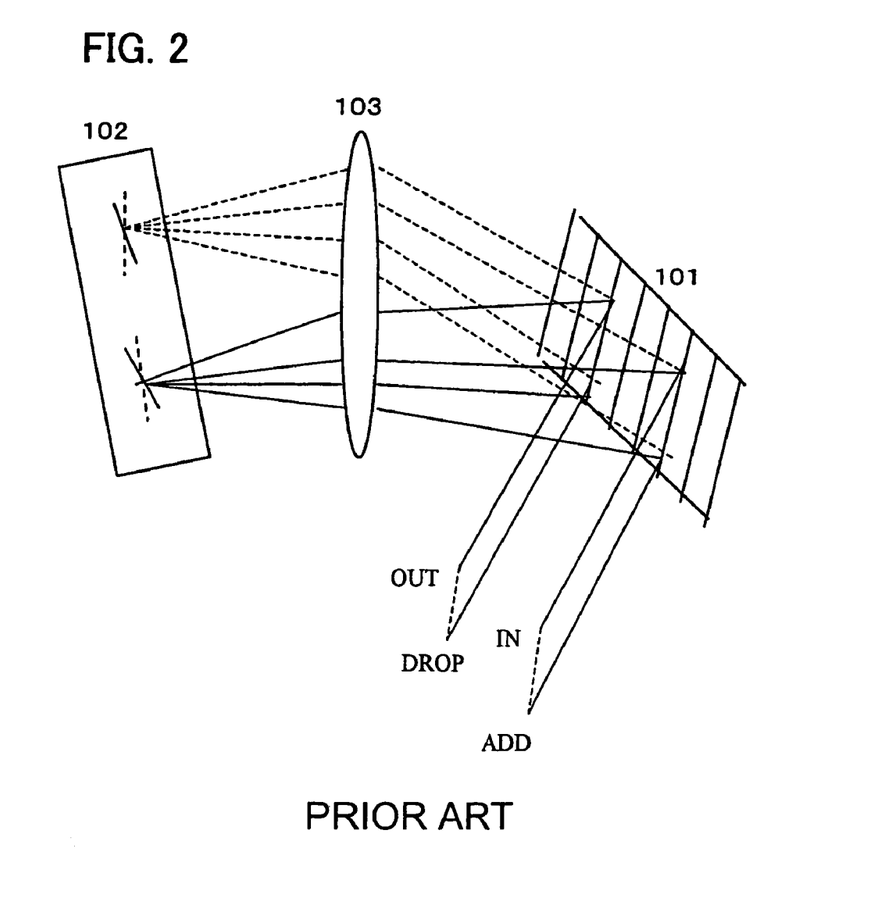
FIG. 2 is a diagram showing an example of a conventional composition of a wavelength switch.

The functions of insertion (Add), passing through (Through) and branching (Drop) of an optical signal at the optical add-drop module 10 are realized by a wavelength switch. For a conventional wavelength switch having such functions, a composition as shown in FIG. 2 is known (see U.S. Pat. No. 5,960,133).

A composition shown in FIG. 2 comprises a combination of a diffraction grating (spectral function) 101, a MEMS (Micro-Electro Mechanical System) mirror 102 having a switching function and a focus lens 103.

The input optical beam (IN) and the insertion optical beam (ADD) are divided by the diffraction granting 101 into optical beams for each wavelength and inputted into the MEMS mirror 102 through the focus lens 103. At the MEMS mirror 102, it is possible to switch an optical beam to either an output (OUT) port or a branch (DROP) port by controlling the angle of the mirror.

Here, in order to downsize a WDM transmission system and reduce the cost on it, it is desired to realize the functions of the optical add-drop module 10 described referring to FIG. 1 using planar lightwave circuit (PLC) type functional integrated circuits capable of being mass-produced using a batch process.

However, for a combination of a diffraction grating 101 and an MEMS mirror 102 having a composition of a conventional example shown in FIG. 2, a high-precision alignment is necessary for the focus lens 103 and the MEMS mirror 102 in order to focus optical beam emitted from the diffraction grating 101, on the MEMS mirror 102.

To this end, there are problems that the number of assembly steps becomes great many and that cost reduction is difficult. Furthermore, it is very difficult to downsize and reduce the thickness of the switch because optical beams are propagated in a three (3)-dimensional space.

SUMMARY OF THE INVENTION

It is therefore an object of the present invention to provide an optical wavelength switch having a planar lightwave circuit structure capable of solving the above disadvantages and realizing reduction in the number of assembly steps and in the cost.

In order to achieve the above object, according to a first aspect of the present invention there is provided an optical wavelength switch having a planar lightwave circuit structure, comprising a first and a second slab wave guides; an array wave guide connected with the first and the second slab wave guides; a movable mirror array having a plurality of reflecting mirrors, arranged on the second slab wave guide opposite to the side where the array wave guide is connected therewith; and an optical wave guide arranged on the first slab wave guide opposite to the side where the array wave guide is connected therewith, for inputting an input optical signal wavelength-multiplexed and outputting an optical signal wavelength-demultiplexed from the input optical signal, wherein the optical wavelength switch has a focal point of an output optical beam from the second slab wave guide at the positions of the plurality of reflecting mirrors constituting the movable mirror array, the optical wavelength switch operable to switch the route of the optical signal reflectively inputted to the second slab wave guide, depending on the set direction of reflection of the plurality of reflecting mirrors.

The plurality of reflecting mirrors constituting the movable mirror array may have dented reflecting faces, and the angle of reflection of the reflecting mirrors may be set bymoving the dented reflecting faces along a direction perpendicular to the optical axis.

Preferably, the optical wavelength switch includes a space between the movable mirror array and the second slab wave guide and includes at the dented portions a clad layer and a core layer having the same structure as that of the second slab wave guide.

In order to achieve the above object, according to a second aspect of the present invention there is provided an optical wavelength switch having a planar wave guide formed on a substrate, the planar wave guide having at least one wave-guide-type diffraction grating which includes an input/output wave guide, a first slab wave guide connected with the input/output wave guide, an array wave guide whose one side is connected with the first slab wave guide, and a second slab wave guide with which the other side of the array wave guide is connected, the optical wavelength switch comprising a moving part supported in a cantilevered manner on the substrate; and a reflecting mirror formed at the tip of the moving part such that it faces an end face of the second slab wave guide, wherein the reflecting mirror is obtained by forming a groove having a dented face on the moving part by etching such that the groove faces the end face of the second slab wave guide, the reflecting mirror being adapted to totally reflect at the dented face a optical beam outputted from the end face of the second slab wave guide.

The moving part may have a clad layer having the same structure as that of the slab wave guide. The core layer and the clad layer may respectively have a refractive index of 1.4142 or higher, with the groove having the dented face forming an air layer. The relationship between positions of the end face of the second slab wave guide and the dented face maybe set such that the angle of incidence of a optical beam entering from the end face of the second slab wave guide into the dented face is 45 degrees or larger in an area from the dented face of the moving part toward the end face of the second slab wave guide.

In order to attain the above object, according to a third aspect of the present invention there is provided an optical wavelength switch having a planar wave guide formed on a substrate, comprising a wave-guide-type diffraction grating which includes an input/output wave guide having an under-clad layer on a sacrificial layer formed on the substrate, a core layer formed on the under-clad layer and an over-clad layer formed on the core layer, a first slab wave guide connected with the input/output wave guide, an array wave guide whose one side is connected with the first slab wave guide, and a second slab wave guide with which the other side of the array wave guide is connected; and a movable girder whose one end is firmly secured to the substrate, the movable girder having the same under-clad layer, core layer and over-clad layer as those of the wave-guide-type diffraction grating, wherein the optical wavelength switch has a reflecting mirror at the tip of the movable girder, the reflecting mirror facing an end face of the second slab wave guide, with the position of the reflecting mirror being set displaceable along a direction perpendicular to the optical axis.

Preferably, the face of the reflecting mirror toward the end face of the second slab wave guide is formed in a dented face.

The optical wavelength switch may have an air layer of a groove etched to the sacrificial layer between the wave-guide-type diffraction grating and the reflecting mirror. The reflecting face of the reflecting mirror may be formed by forming a high-reflectivity film on a groove wall, toward the end face of the second slab wave guide, of the groove formed by etching reaching a part of the under-clad layer of the movable part.

It is preferred that the optical wavelength switch have two of the wave-guide-type diffraction grating. Preferably, the two first slab wave guides respectively have a part common to each other and are integrated such that end faces for connecting the input/output wave guide are different from each other. Preferably, the two second slab wave guides respectively have a part common to each other and are integrated such that end faces for connecting respectively different reflecting mirror arrays are different from each other.

In order to attain the above object, according to a fourth aspect of the present invention there is provided a method for fabricating an optical function device having a wavelength switching function, the method comprising the steps of forming a sacrificial layer of GSG (germanium-added silica glass) on a silicon substrate: forming a wave guide structure having an under-clad layer and an over-clad layer of BPSG (boron-and-phosphorus-added silica glass) or PSG (phosphorus-added silica glass) and a core layer of GPSG (germanium-and-phosphorus-added silica glass) formed between the under-clad layer and the over-clad layer; forming the shape of a movable part and a wave guide end face by applying anisotropic etching of the over-clad layer and the under-clad layer or the core layer reaching the sacrificial layer; and separating the movable part from the substrate by removing the sacrificial layer beneath the movable part by applying isotropic etching.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Figure 3:
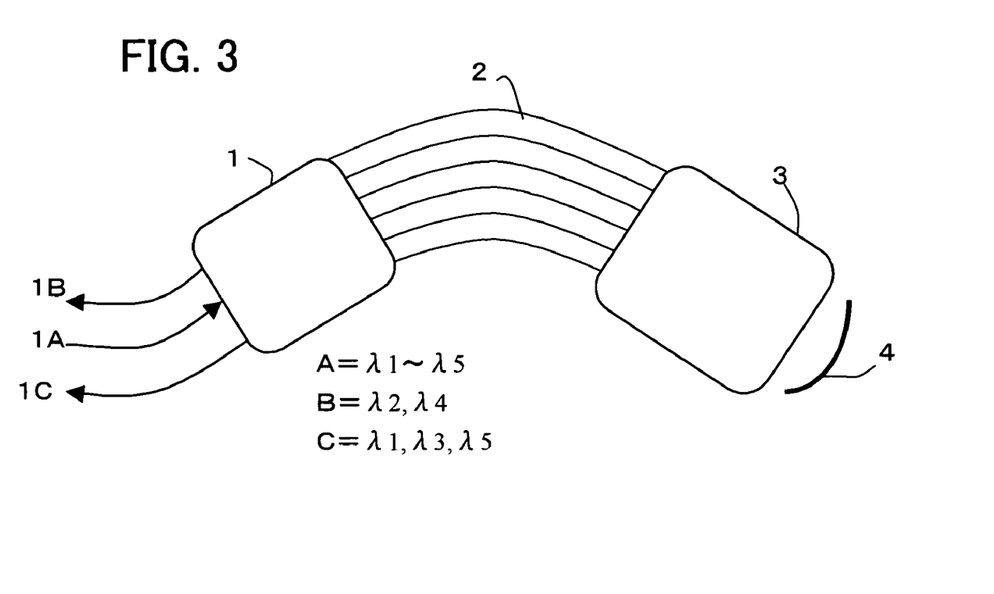
FIG. 3 is a diagram showing a composition of an optical wavelength switch having a planar lightwave circuit structure according to the invention.
Figure 4:
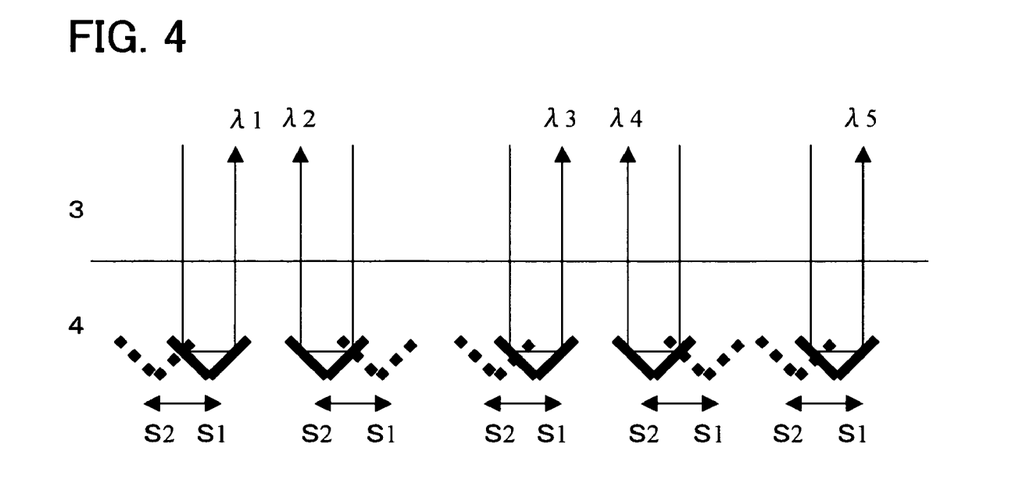
FIG. 4 is a diagram showing the operational principle of the invention.

FIG. 3 shows a diagram of the composition of an optical wavelength switch having a planar lightwave circuit structure according to the invention and FIG. 4 illustrates the operational principle of the invention.

The planar optical wavelength switch structure according to the invention shown in FIG. 3 is a PLC (Planar Lightwave Circuit) type circuit formed on a silicon substrate using PLC technology and having two (2) slab wave guides 1 and 3, an array wave guide 2 and a movable mirror array 4. An input wave guide 1A, output wave guides 1B and 1C are connected with one side of the slab wave guide 1, and one side of the array wave guide 2 is connected with the other side of the slab wave guide 1. The slab wave guide 3 is connected with the other side of the array wave guide 2. Thereby, a wave-guide-type diffraction grating is composed.

Furthermore, on the PLC, the movable mirror array 4 integrated monolithically is formed at a focusing position of the wave-guide-type diffraction grating.

The slab wave guides 1 and 3 are composed of planar mediums having a one (1)-layer or a multi-layer structure of dielectric etc. and has a property that it propagates optical signals in the direction along the plane. A multi-wavelength optical signal inputted into the slab wave guides 1 and 3 propagates spreading on a slab wave guide plane and the propagated input optical beam 1A is inputted into an optical wave guide at the position corresponding to the array wave guide 2.

The optical signal propagated through the array wave guide 2 is supplied with a difference of an optical path length corresponding to the length of the array wave guide and is inputted into the slab wave guide 3. The optical signal propagates in a predetermined direction along a plane, is focused by diffraction into a different direction for each wavelength and is injected into the position of the movable mirror array 4.

FIG. 4 is a diagram illustrating the operational principle of the movable mirror array 4. In the figure, plurality of reflecting mirrors are arranged corresponding to the focused position for each wavelength. Each of the reflecting mirrors forms a V-shaped reflecting mirror and is formed movable between a first state S1 and a second state S2 as shown in FIG. 4.

The path of a optical beam injected into a reflecting mirror moved to the state S1 is turned by the reflecting mirror and the optical beam is injected into the slab wave guide 3, being diverged to the right compared to the optical beam injected into the reflecting mirror. Therefore, the optical beam returns backward through the wave-guide-type diffraction grating and is focused at a position diverged from the input wave guide. Therefore, the optical signal is outputted at the output 1B by arranging the output wave guide at this focused position.

The optical beam reflected and returned by a reflecting mirror moved to the state S2 similarly to the above, being diverged to the left compared to the injected optical beam is outputted from the output wave guide 1C.

As described above, by switching the reflecting mirror to the state S1 or the state S2 of the focused position of the optical beam for each wavelength, an optical wavelength switch is composed, which switches an optical beam inputted from the input port 1A such that it is outputted from the output ports 1B or 1C for each wavelength.

In an example shown in FIG. 3, optical signals having respectively wavelengths λ1–5 are wavelength-multiplexed as the input optical beam 1A. The optical signals having the wavelengths λ2 and λ4 are outputted at the first output port 1B and the optical signals having the wavelengths λ1, λ3 and λ5 are outputted at the second output port 1C.

Figure 5:
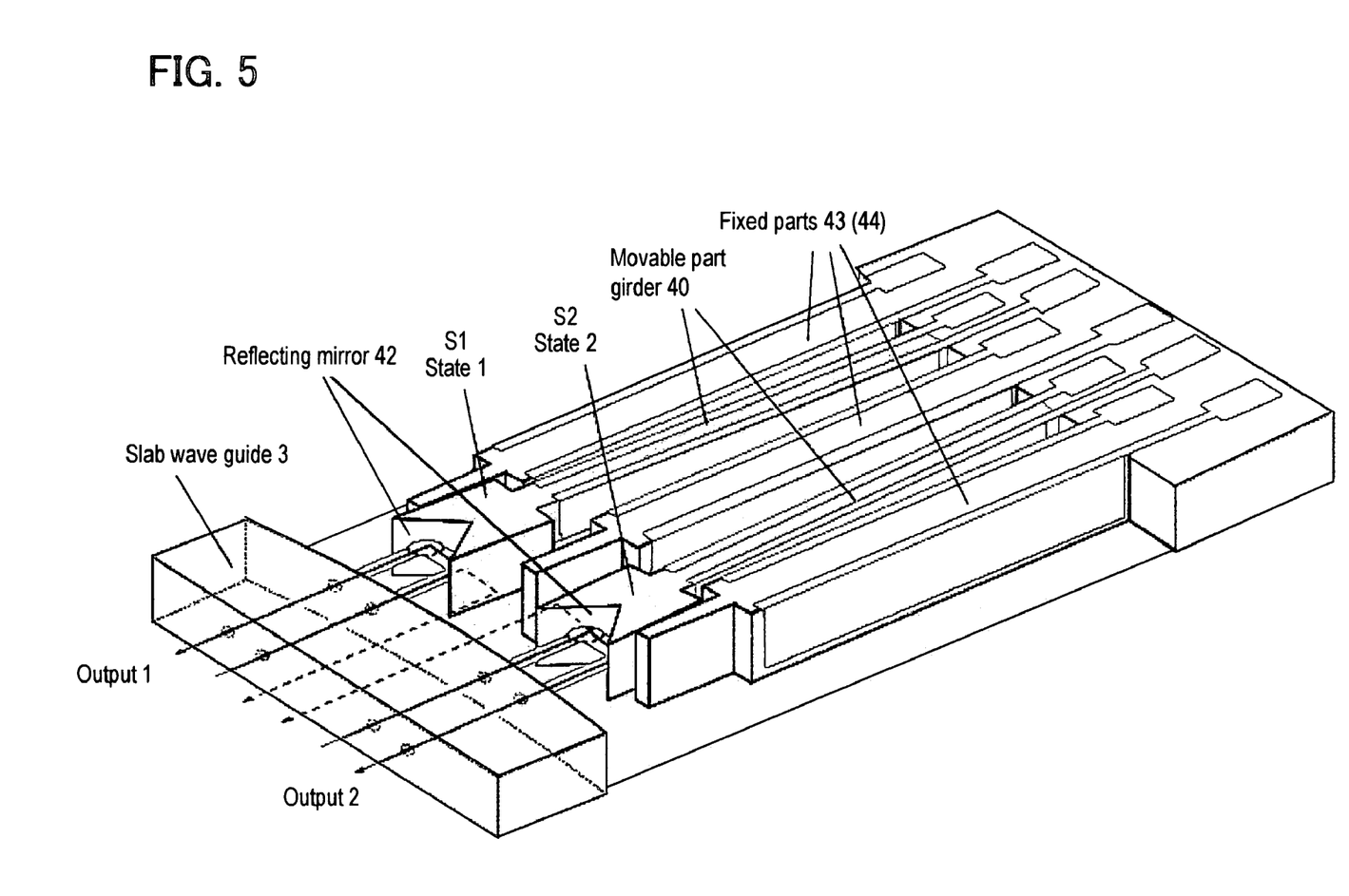
FIG. 5 is a perspective view of an example of the composition of a movable mirror array 4 of an optical wavelength switch.
Figure 6:
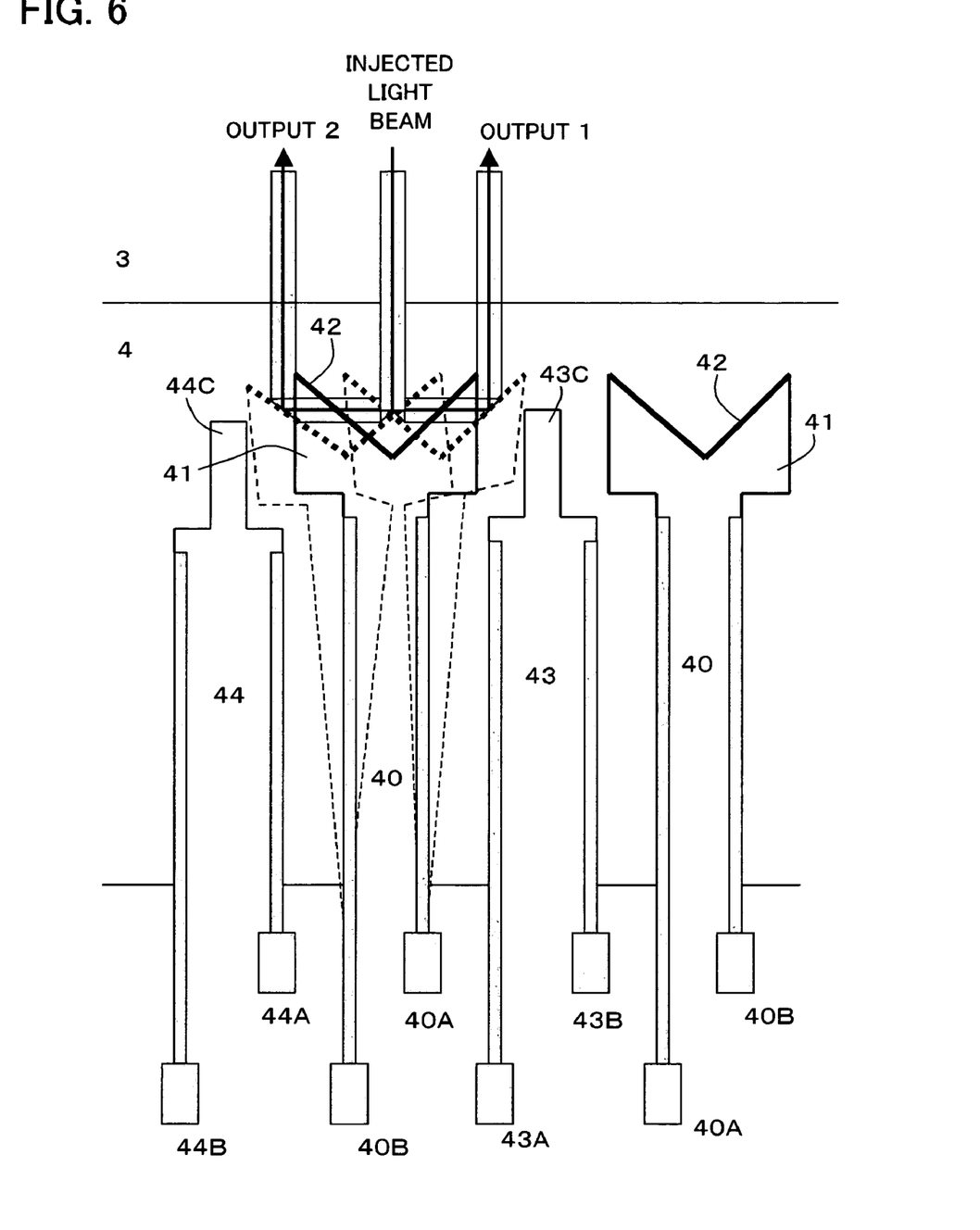
FIG. 6 is a plan view of the movable mirror array shown in FIG. 5.

FIGS. 5 and 6 show the composition of a first embodiment of the movable mirror array 4 constituting the optical wavelength switch of the invention. FIG. 5 is a perspective view showing an example of the composition of the movable mirror array 4 of the optical wavelength switch. FIG. 6 is a plan view of the movable mirror array 4 shown in FIG. 5. Each of the figures shows only a part of a plurality of the reflecting mirrors constituting the movable mirror array 4.

In the movable mirror array 4 formed on a substrate 100 made of, for example, silicon, a movable part consists of a movable part girder 40 and a reflecting-mirror-forming part 41. The movable part does not contact the substrate 100 and is supported above the substrate 100 by an end of the movable part girder 40 in a state like a cantilever.

In addition, movable part electrodes 40A and 40B are formed on both side faces of the movable part girder 40. The face of the end of the reflecting-mirror-forming part 41 on the side of the slab wave guide 3 is V-shaped and a reflecting mirror 42 is formed on its surface by a metal film etc.

Furthermore, fixed parts 43 and 44 fixed to the substrate 100 are formed next to and respectively on both sides of the reflecting-mirror-forming part 41, and fixed part electrodes 43A, 43B and 44A, 44B are formed respectively on both sides of the fixed parts 43 and 44.

When a voltage is applied between the fixed part electrode 43A and the movable part electrode 40A, a static attraction force acts between both of these parts, the movable part girder 40 fixed only at its one (1) side to the substrate 100 is attracted to the fixed part 43, the mirror forming part 41 strikes a mirror positioning part 43C formed at the tip of the fixed part 43 and the state S1 is held.

Similarly to the above, when a voltage is applied between the fixed part electrode 44A and a movable part electrode 40B, the state S2 is held. With such a structure, it is possible to switch an injected optical beam to the output 1 or the output 2.

As an embodiment of the invention, in the composition shown in FIGS. 5 and 6, an electro-static force is used as the force to move a movable part, however, the invention is not limited to this embodiment. For example, it is possible to obtain the same action as above using an electromagnetic force, or using a force of a piezoelectric strain by forming a piezoelectric material on the side of a movable part.

In the embodiment of the invention, the switching function has been described limiting the position of the reflecting mirror 42 to the state S1 and state S2. However, it is possible to hold the reflecting mirror at an intermediate state between the state S1 and the state S2 by adjusting the voltage to be applied between the electrodes.

In the case of such a structure, since the amount of optical beam to be coupled to an output can be adjusted, it is also possible for the switch to have a function as an optical variable attenuator.

When the difference between refractive indexes of the slab wave guide 3 and air is large, the beam diameter of a optical beam emitted from the slab wave guide 3 becomes larger while the optical beam propagates the space to the reflecting mirror 42. Thereby, coupling loss may become large and reflection loss is generated at the end surface when the optical beam is infected again into the slab wave guide 3.

In order to reduce this, it is possible to fill the space portion with matching liquid having a refractive index equal to or somewhat higher than that of the wave guide core layer.

Figure 7A:
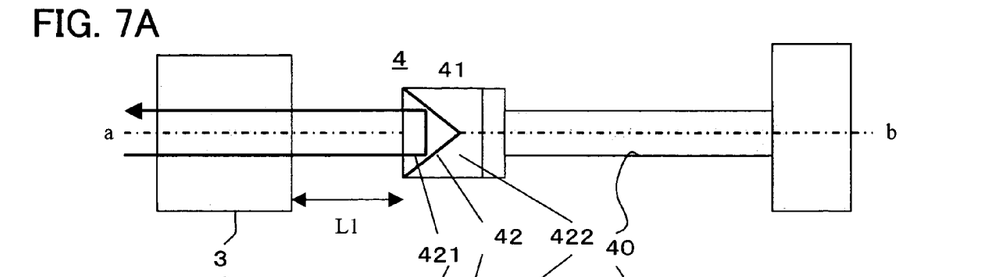
FIG. 7 is a diagram showing the structure of the movable mirror array 4 according to a second embodiment of the invention.
Figure 7B:
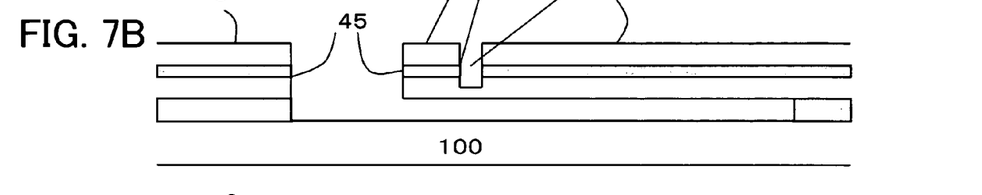
Figure 7C:
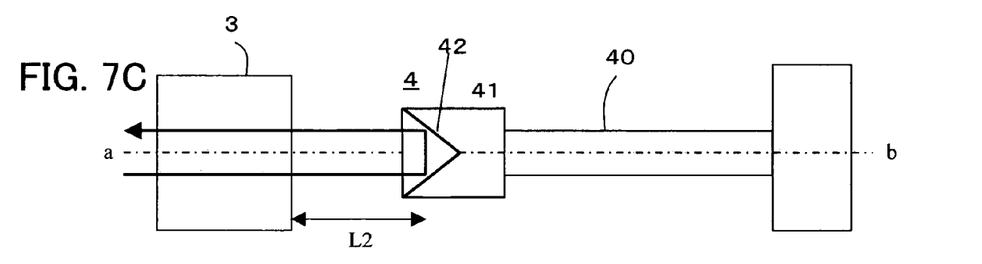

FIG. 7 is a diagram showing the structure of the movable mirror array 4 according to a second embodiment of the invention and FIG. 7A is a plan view of a portion of the movable mirror array 4 and FIG. 7B shows a cross-sectional view formed by cutting out along the dotted line a–b in FIG. 7A. FIG. 7C is a plan view of a portion of the movable mirror array 4 in the embodiment shown in FIG. 6 to be compared with FIG. 7A.

In FIG. 7, the composition except the reflecting-mirror-forming part 41 is same as that of the first embodiment shown in FIGS. 5 and 6.

In the embodiment, for the reflecting-mirror-forming part 41, a mirror part slab wave guide structure 421 is formed inside the surface of the V-shaped reflecting mirror 42. This can be easily realized by forming a mirror-forming groove 422 on the reflecting-mirror-forming part 41.

Thereby, it is possible to shorten a distance L1 for which the optical beam emitted from the slab wave guide 3 propagates free space (air layer) until it is reflected by the surface of the reflecting mirror 4 and is re-coupled to the slab wave guide 3 (the relationship between the distance L1 and a distance L2 shown in FIG. 7C corresponding to the embodiment shown in FIG. 5 is L2>L1).

Thereby, according to the embodiment shown in FIGS. 7A and 7B, coupling loss of the movable mirror array 4 and the slab wave guide 3 can be considerably reduced.

Here, in the case where the angle of incidence from the slab wave guide 3 to the slab wave guide structure 421 is set such that the requirements for total reflection at the V-shaped end face of the slab wave guide structure 421 is satisfied, the V-shaped end face of the slab wave guide structure 421 functions as it is as a total reflection mirror 42. Surely, it is possible that the end face can be used being coated with a high-reflectivity film such as a metal film.

In the embodiment, the angle of incidence of the optical beam emitted from the slab wave guide-421 to the V-shaped reflecting mirror 42 is set at 45° and the angle between the V-shape is formed such that its angle is 90°.

In the case where the wave guide core layer and the clad layer are formed such that their refraction index is 1.142 or more, the requirements for total reflection are satisfied between them and the air layer in the groove part 422 when the optical beam emitted from the slab wave guide 3 enters into the slab wave guide 421. Thereby, the mirror forming part end face functions as the total reflection mirror 42.

Furthermore, since the optical beam returned back at one (1) side of the V-shape enters the other side of the V-shape at the angle of incidence of 45°, this point also can turn back the optical beam in parallel to the emitted optical beam from the slab wave guide 3 toward the slab wave guide 3 satisfying the requirements for total reflection.

Figure 8:
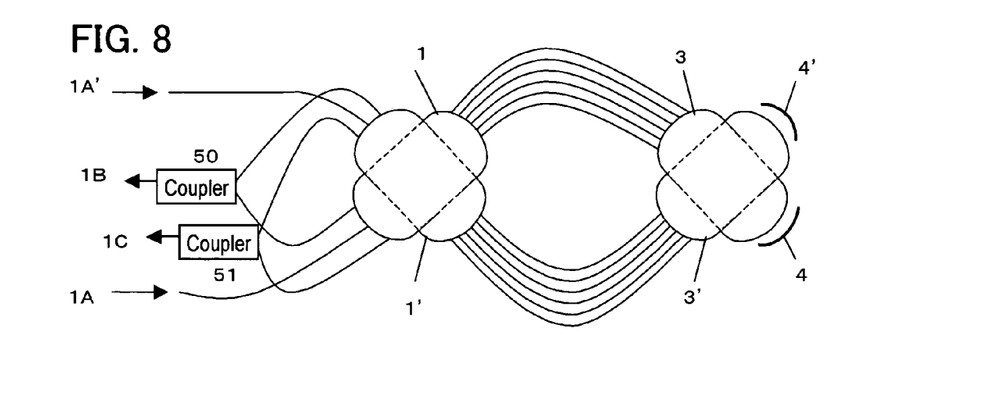
FIG. 8 is a diagram of the composition of an optical wavelength switch having another planar lightwave circuit structure according to the invention and its operational principle is shown in FIG. 9.

FIG. 8 is a diagram showing the composition of yet another optical wavelength switch having a planar lightwave circuit structure according to the invention and FIG. 9 illustrates the operational principle of this embodiment.

In this embodiment, two (2) sets of the basic circuit of "a diffraction grating+a mirror array" composed of the slab wave guides 1 and 3, the array wave guide 2 and the movable mirror array 4 of the first embodiment shown in FIG. 3 are prepared and they are composed such that one of them is superposed on the other to share a part of slab wave guides 1 and 1' and a part of slab wave guides 3 and 3' respectively.

With such a composition, it is possible to reduce the footprint of the circuit and to increase the number of chips obtained from one (1) silicon substrate. Furthermore, by coupling the outputs of the slab wave guides 1 and 1' of the two (2) basic circuits using couplers 50 and 51, optical cross-connect function capable of exchanging optical beams having arbitrary wavelengths between inputs 1A and 1A' and outputs 1B and 1C is possible.

For example, denoting wavelengths of optical signals of the input 1A and 1A' respectively as λA1–A5 and λB1–B5, optical signals having the wavelengths λA1, λB2, λA3, λB4 and λA5 are outputted as a first output from the coupler 50 and optical signals having the wavelengths λB1, λA2, λB3, λA4 and λB5 are outputted as a second output from the coupler 51.

Figure 9A:
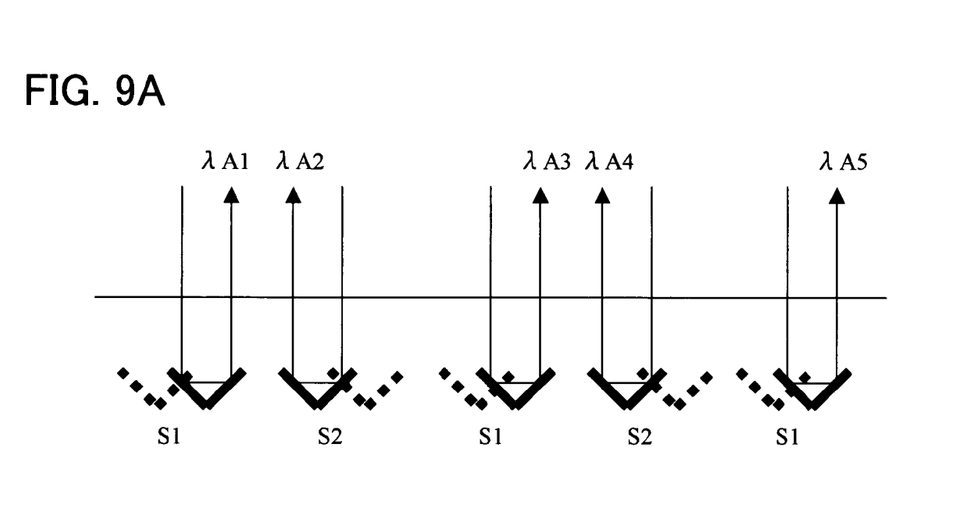
FIG. 9 is a diagram showing the operational principle of the embodiment shown in FIG. 8.
Figure 9B:
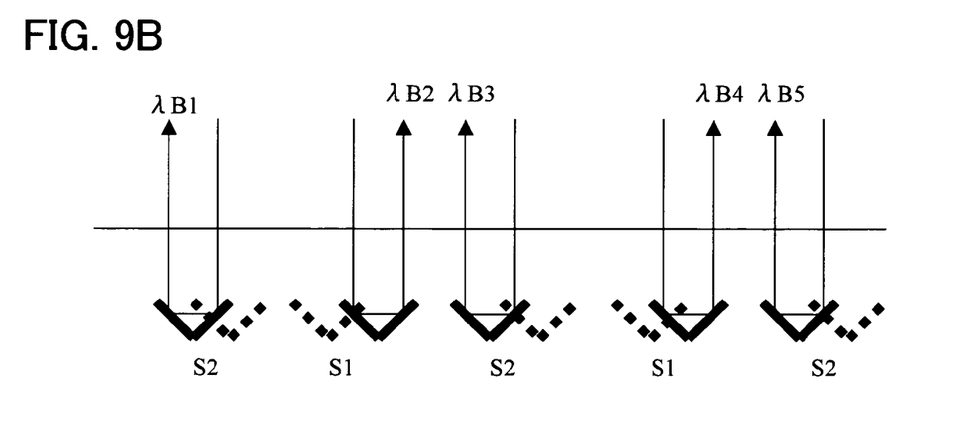

FIG. 9 is a diagram illustrating states of a plurality of reflecting mirrors in the movable mirror array 4 and 4' to obtain the relationship of inputs and outputs under such conditions. FIG. 9A is a diagram illustrating the states of the reflecting mirrors in the movable mirror array 4 corresponding to the slab wave guide 3. FIG. 9B is a diagram illustrating the states of the reflecting mirrors in the movable mirror array 4' corresponding to the slab wave guide 3'.

Figure 10A:
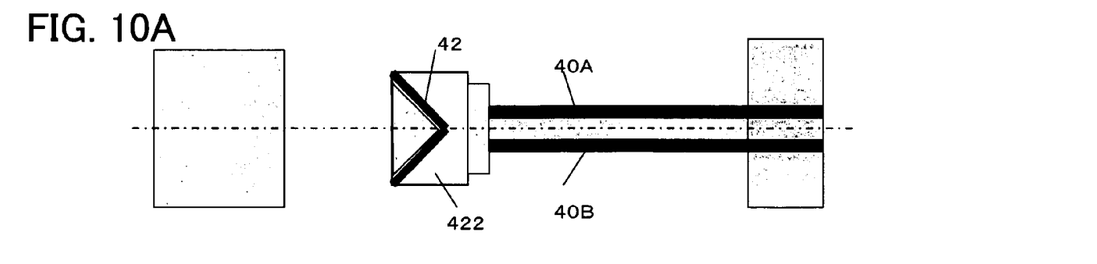
FIG. 10 is a diagram illustrating fabrication steps of a movable mirror array of an optical wavelength switch according to the invention.

Next, fabrication steps of a movable mirror array of an optical wavelength switch according to the invention will be described referring to FIG. 10. FIG. 10A is a plane view of an optical wavelength switch having the structure of the reflecting-mirror-forming block 41 shown in FIG. 7A and the fabrication step will be described as follows taking this as an example.

Figure 10B:
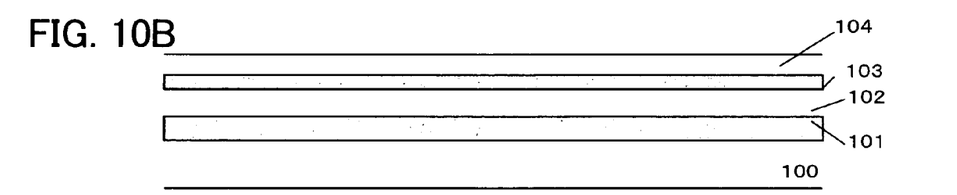

In FIG. 10B, a GSG (germanium-added silica glass) layer to be a sacrificial layer 101 is first formed as a film on the silicon (Si) substrate 100, next, a BPSG (boron-and-phosphorus-added silica glass) layer or a PSG (phosphorus-added silica glass) layer to be an under-clad layer 102 is formed and, then, a GPSG (germanium-and-phosphorus-added silica glass) layer to be a core layer 103 is formed as a film.

Next, an etching mask (photo-resist etc.) for forming a core pattern is formed on the core layer 102 and an isotropic etching is applied through this mask by RIE (Reactive Ion Etching).

A wave guide core pattern is fabricated by removing the core layer 103 except the pattern portion. Thereafter, a BPSG layer to be an over-clad layer 104 is formed as a film. Thereby, a core-embedded wave guide structure is formed.

As methods for forming the films of sacrificial layer 101, the under-clad layer 102, the core layer 103 and the over-clad layer, approaches such as CVD (Chemical Vapor Deposition), FHD (Flame Hydrolysis Deposition), sputtering etc. may be used.

Figure 10C:
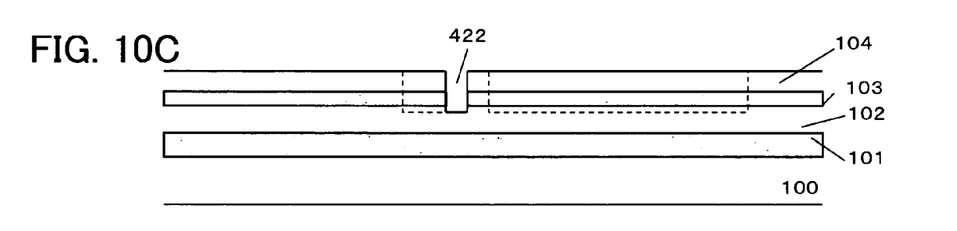

In FIG. 10C, an etching mask is formed on the over-clad layer with photo-resist etc. and the portion down to the middle of the thickness of the under-clad layer 102 is etched by a directional etching such as RIE. Thereby, the mirror-forming groove 422 is formed as well as the side faces of the movable part girder 40 is exposed to the middle of the thickness of the under-clad layer 102.

Figure 10D:
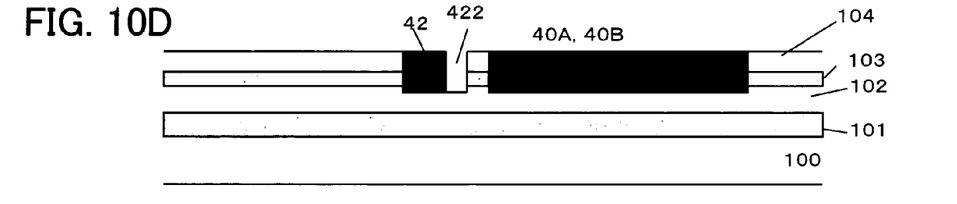

Next, in FIG. 10D, a metal film is formed on the V-shaped end face portion of the mirror-forming groove 422 and the side faces of the movable part girder 40 using CVD, electro-less plating, vapor deposition etc. Thereby, the reflecting mirror 42 and electrodes 40A and 40B are formed.

Figure 10E:
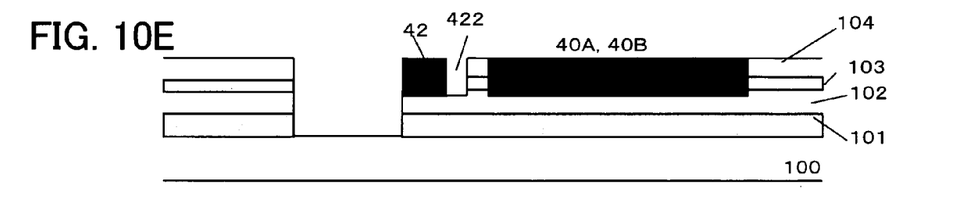

In FIG. 1E, furthermore, after the shape of the moving portion 40 has been patterned with photo-resist etc., the shape of the moving part 40 is formed by etching the silicon substrate 100 with a directional etching such as RIE etc.

Figure 10F:
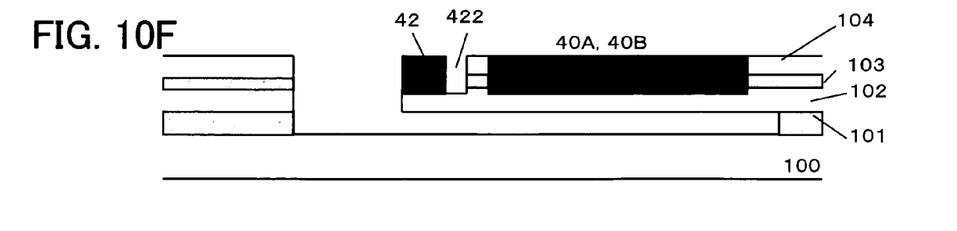

Finally, in FIG. 10F, after the portion other than the moving part 40 has been masked with photo-resist etc., an etching is applied using a very dilute hydrofluoric-acid-and-nitric-acid solution (hydrofluoric acid:nitric acid:water=1:1:50).

In this step, a GSG (germanium-added silica glass) film being the sacrificial layer 101 is solved very fast by the hydrofluoric-acid-and-nitric-acid solution, by 100 times as fast as the BPSG film or the PSG film forming the under-clad layer 102 and GPSG film forming the core. Therefore, it is possible to etch only the sacrificial layer 101 selectively. Thereby, the moving part 40 can be separated from the substrate 100 and the moving mirror 4 in a cantilever-girder shape can be formed.

Here, since the GSG layer is inserted for the selective etching, it is needless to say that the GSG layer can be any kind of film as far as it is an insulating film having a larger etching selectivity ratio against the films forming the clad layer and the core layer.

In the above embodiment, at the moving mirror array 4, switching the reflecting mirror to either of the two (2) states S1 and S2 has been described. However, it is possible to cause the reflecting mirror to have a function as a variable attenuator by controlling it such that it is positioned at an intermediate position between the states S1 and S2 as referred to previously.

Therefore, the definition of a term, "optical wavelength switch" in this application covers an optical function device having a function as a variable attenuator.

As the embodiments have been described with reference to the drawings, according to the invention, an optical function device having a wavelength switching function can be realized by using a wave-guide-type diffraction grating formed on a substrate with PLC (planar lightwave Circuit) technology, for the spectral function and, furthermore, integrating MEMS mirrors on a substrate monolithically.

According to the invention, any alignment step is not necessary and the number of fabrication steps are considerably reduced since the spectral function part and the switching function part are integrated on one (1) substrate monolithically. In addition, drastic cost reduction can be expected since batch fabrication is possible using wafer processes.

Furthermore, downsizing and thickness reduction can be easily realized since an optical beam is confined and propagated in a wave guide fabricated on a substrate. According to the invention, an optical wavelength switch having a planar lightwave circuit structure is provided that is capable of realizing reduction of the number of the fabrication steps and lower cost.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An optical wavelength switch comprising:
   a first and a second slab wave guides;
   an array wave guide connected with the first and the second slab wave guides;
   a movable mirror array having a plurality of reflecting mirrors, arranged on the second slab wave guide opposite to the side where the array wave guide is connected therewith; and
   an optical wave guide arranged on the first slab wave guide opposite to the side where the array wave guide is connected therewith, for inputting an input optical signal wavelength-multiplexed and outputting an optical signal wavelength-demultiplexed from the input optical signal, wherein
   the optical wavelength switch has a focal point of an output optical beam from the second slab wave guide at the positions of the plurality of reflecting mirrors constituting the movable mirror array, the optical wavelength switch operable to switch the route of the optical signal reflectively inputted to the second slab wave guide, depending on the set direction of reflection of the plurality of reflecting mirrors; wherein
   the plurality of reflecting mirrors constituting the movable mirror array have dented reflecting faces, and wherein
   the angle of reflection of the reflecting mirrors is set by moving the dented reflecting faces along a direction perpendicular to the optical axis.

2. The optical wavelength switch according to claim 1, wherein the optical wavelength switch includes a space between the movable mirror array and the second slab wave guide and includes at the dented portions a clad layer and a core layer having the same structure as that of the second slab wave guide.

3. An optical wavelength switch having a planar wave guide formed on a substrate,
   the planar wave guide having at least one wave-guide-type diffraction grating which includes
   an input/output wave guide,
   a first slab wave guide connected with the input/output wave guide,
   an array wave guide whose one side is connected with the first slab wave guide, and
   a second slab wave guide with which the other side of the array wave guide is connected,
   the optical wavelength switch comprising:
   a moving part supported in a cantilevered manner on the substrate; and
   a reflecting mirror formed at the tip of the moving part such that it faces an end face of the second slab wave guide, wherein
   the reflecting mirror is obtained by forming a groove having a dented face on the moving part by etching such that the groove faces the end face of the second slab wave guide, the reflecting mirror being adapted to totally reflect at the dented face a optical beam outputted from the end face of the second slab wave guide.

4. The optical wavelength switch according to claim 3, wherein
   the moving part has a clad layer having the same structure as that of the slab wave guide, wherein
   the core layer and the clad layer respectively have a refractive index of 1.4142 or higher, with the groove having the dented face forming an air layer, and wherein
   the relationship between positions of the end face of the second slab wave guide and the dented face is set such that the angle of incidence of a optical beam entering from the end face of the second slab wave guide into the dented face is 45 degrees or larger in an area from the dented face of the moving part toward the end face of the second slab wave guide.

5. An optical wavelength switch according to claim 3, wherein
   the optical wavelength switch has two of the wave-guide-type diffraction grating, wherein
   the two first slab wave guides respectively have a part common to each other and are integrated such that end faces for connecting the input/output wave guide are different from each other, and wherein
   the two second slab wave guides respectively have a part common to each other and are integrated such that end faces for connecting respectively different reflecting mirror arrays are different from each other.

6. An optical wavelength switch having a planar wave guide formed on a substrate, comprising:
   a wave-guide-type diffraction grating which includes
   an input/output wave guide having an under-clad layer on a sacrificial layer formed on the substrate, a core layer formed on the under-clad layer and an over-clad layer formed on the core layer,
   a first slab wave guide connected with the input/output wave guide,
   an array wave guide whose one side is connected with the first slab wave guide, and
   a second slab wave guide with which the other side of the array wave guide is connected; and
   a movable girder whose one end is firmly secured to the substrate, the movable girder having the same under-clad layer, core layer and over-clad layer as those of the wave-guide-type diffraction grating, wherein
   the optical wavelength switch has a reflecting mirror at the tip of the movable girder, the reflecting mirror facing an end face of the second slab wave guide, with the position of the reflecting mirror being set displaceable along a direction perpendicular to the optical axis.

7. The optical wavelength switch according to claim 6, wherein the face of the reflecting mirror toward the end face of the second slab wave guide is formed in a dented face.

8. The optical wavelength switch according to claim 6, wherein
   the optical wavelength switch has an air layer of a groove etched to the sacrificial layer between the wave-guide-type diffraction grating and the reflecting mirror, and wherein
   the reflecting face of the reflecting mirror is formed by forming a high-reflectivity film on a groove wall, toward the end face of the second slab wave guide, of the groove formed by etching reaching a part of the under-clad layer of the movable part.

* * * * *